(12) United States Patent
Asai et al.

(10) Patent No.: US 10,668,856 B2
(45) Date of Patent: Jun. 2, 2020

(54) DISPLAY CONTROL DEVICE FOR VEHICLE, DISPLAY CONTROL SYSTEM FOR VEHICLE, DISPLAY CONTROL METHOD FOR VEHICLE

(71) Applicant: TOYOTA JIDOSHA KABUSHIKI KAISHA, Toyota-shi (JP)

(72) Inventors: Goro Asai, Toyota (JP); Tomoaki Iida, Okazaki (JP)

(73) Assignee: TOYTOA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/921,874

(22) Filed: Mar. 15, 2018

(65) Prior Publication Data
US 2018/0272938 A1 Sep. 27, 2018

(30) Foreign Application Priority Data
Mar. 22, 2017 (JP) .................................. 2017-055947

(51) Int. Cl.
*B60R 1/00* (2006.01)

(52) U.S. Cl.
CPC ............ *B60R 1/00* (2013.01); *B60R 2300/30* (2013.01); *B60R 2300/70* (2013.01); *B60R 2300/8046* (2013.01); *B60R 2300/8093* (2013.01)

(58) Field of Classification Search
CPC .................. B60R 1/00; B60R 2300/30; B60R 2300/8046
USPC ........................................................ 348/118
See application file for complete search history.

(56) References Cited

U.S. PATENT DOCUMENTS

| 2005/0232469 A1* | 10/2005 | Schofield | B60R 1/12 382/104 |
| 2012/0218412 A1* | 8/2012 | Dellantoni | G01C 21/3679 348/148 |
| 2012/0224061 A1* | 9/2012 | Pilgrim | B60R 1/00 348/148 |
| 2013/0229523 A1* | 9/2013 | Higgins-Luthman | H04N 5/23241 348/148 |

(Continued)

FOREIGN PATENT DOCUMENTS

| EP | 3389257 A1 * | 10/2018 | .......... H04N 5/2355 |
| JP | 9-71198 A | 3/1997 | |

(Continued)

*Primary Examiner* — Richard A Hansell, Jr.
(74) *Attorney, Agent, or Firm* — Oblon, McClelland, Maier & Neustadt, L.L.P.

(57) ABSTRACT

A display control device for a vehicle includes at least one electronic control unit configured to: cause a display device to display a host vehicle's behind-the-vehicle image, the host vehicle's behind-the-vehicle image being an image of an area behind a host vehicle, the host vehicle's behind-the-vehicle image being captured by a sensor of the host vehicle; detect a rearward vehicle, the rearward vehicle being another vehicle existing behind the host vehicle; cause the display device to display the host vehicle's behind-the-vehicle image with a first contrast ratio when the rearward vehicle is not detected; and cause the display device to display the host vehicle's behind-the-vehicle image with a second contrast ratio when the rearward vehicle is detected, the second contrast ratio being higher than the first contrast ratio.

5 Claims, 6 Drawing Sheets

(56) References Cited

U.S. PATENT DOCUMENTS

| | | | |
|---|---|---|---|
| 2013/0332040 A1* | 12/2013 | Wu | G01S 13/60 |
| | | | 701/70 |
| 2014/0232872 A1* | 8/2014 | Kussel | B60R 1/00 |
| | | | 348/148 |
| 2015/0251602 A1* | 9/2015 | Baur | B60R 1/00 |
| | | | 348/148 |
| 2018/0018939 A1* | 1/2018 | Choi | G09G 5/10 |

FOREIGN PATENT DOCUMENTS

| | | | | |
|---|---|---|---|---|
| JP | H0971198 A | * | 3/1997 | B60R 21/00 |
| JP | 2009-75988 A | | 4/2009 | |
| JP | 2014-238781 A | | 12/2014 | |
| JP | 5888339 | | 3/2016 | |
| WO | WO-2015151404 A1 | * | 10/2015 | B60R 1/00 |

\* cited by examiner

DISPLAY CONTROL DEVICE FOR VEHICLE, DISPLAY CONTROL SYSTEM FOR VEHICLE, DISPLAY CONTROL METHOD FOR VEHICLE

INCORPORATION BY REFERENCE

The disclosure of Japanese Patent Application No. 2017-055947 filed on Mar. 22, 2017 including the specification, drawings and abstract is incorporated herein by reference in its entirety.

BACKGROUND

1. Technical Field

The present disclosure relates to a display control device for a vehicle, a display control system for a vehicle, and a display control method.

2. Description of Related Art

For example, Japanese Patent No. 5888339 discloses a device that displays a vehicle's behind-the-vehicle image captured by a capturing unit, such as a camera provided outside the vehicle, on a display unit such as a display provided in the vehicle interior.

SUMMARY

An image captured by a camera tends to have a higher contrast ratio than an image formed on an optical mirror. For this reason, in order to make an image, captured by a camera, closer to an image formed on an optical mirror, it is better to decrease the contrast ratio of the image captured by the camera.

On the other hand, when another vehicle traveling behind the host vehicle (hereinafter referred to as a "rearward vehicle") is shown in an image captured by the camera, it is desirable that the image have a higher contrast ratio to make it easy to recognize the relative vehicle speed between that vehicle and the host vehicle.

The present disclosure provides a display control device for a vehicle that makes it possible to display an image closer to an image formed on the optical mirror and at the same time, when there is a rearward vehicle, makes it easier to recognize the relative vehicle speed between the host vehicle and the rearward vehicle.

A first aspect of the present disclosure provides a display control device for a vehicle. The display control device for a vehicle according to the first aspect includes at least one electronic control unit configured to: cause a display device to display a host vehicle's behind-the-vehicle image, the host vehicle's behind-the-vehicle image being an image of an area behind a host vehicle, the host vehicle's behind-the-vehicle image being captured by a sensor of the host vehicle; detect a rearward vehicle, the rearward vehicle being another vehicle existing behind the host vehicle; cause the display device to display the host vehicle's behind-the-vehicle image with a first contrast ratio when the rearward vehicle is not detected; and cause the display device to display the host vehicle's behind-the-vehicle image with a second contrast ratio when the rearward vehicle is detected, the second contrast ratio being higher than the first contrast ratio.

In the first aspect, the display control device sets the contrast ratio of an image, captured by the capturing unit, higher when there is a rearward vehicle that is another vehicle behind the host vehicle than when there is not a rearward vehicle and then displays the image on the display unit.

According to the configuration described above, the display control device can display an image, closer to an image on the optical mirror, on the display unit if there is not a rearward vehicle. On the other hand, if there is a rearward vehicle, the display control device can display an image on the display unit in such a way that the driver feels it easier to recognize the movement of the rearward vehicle in the image displayed on the display unit. Therefore, if there is a rearward vehicle, the display control device reduces a driver's error in sensing the relative vehicle speed between the host vehicle and the rearward vehicle.

In the first aspect, the at least one electronic control unit may be configured to: calculate a relative vehicle speed between the rearward vehicle and the host vehicle; and cause the display device to display the host vehicle's behind-the-vehicle image with a third contrast ratio when the rearward vehicle is detected and when the relative vehicle speed is equal to or greater than a predetermined threshold value, the third contrast ratio being higher than the second contrast ratio.

According to this configuration, if there is a rearward vehicle, the driver feels it easier to recognize the movement of the rearward vehicle in the image displayed on the display unit. In this way, the display control device further reduces a driver's error in sensing the relative vehicle speed between the host vehicle and the rearward vehicle.

In the first aspect, the display device may be an electronic mirror mounted on the host vehicle.

A second aspect of the present disclosure provides a display control system for a vehicle. The display control system for a vehicle according to the second aspect includes a display device mounted on a host vehicle; and at least one electronic control unit configured to cause the display device to display a host vehicle's behind-the-vehicle image, the host vehicle's behind-the-vehicle image being an image of an area behind the host vehicle, the host vehicle's behind-the-vehicle image being captured by a sensor of the host vehicle, cause the display device to display the host vehicle's behind-the-vehicle image with a first contrast ratio when a rearward vehicle is not displayed on the display device, the rearward vehicle being another vehicle existing behind the host vehicle, and cause the display device to display the host vehicle's behind-the-vehicle image with a second contrast ratio when the rearward vehicle is displayed on the display device, the second contrast ratio being higher than the first contrast ratio.

In the second aspect, the at least one electronic control unit may be configured to calculate a relative vehicle speed between the rearward vehicle displayed on the display device and the host vehicle, and cause the display device to display the host vehicle's behind-the-vehicle image with a third contrast ratio when the relative vehicle speed is equal to or greater than a predetermined threshold value, the third contrast ratio being higher than the second contrast ratio.

A third aspect of the present disclosure provides a display control method for a vehicle. The display control method for a vehicle according to the third aspect includes causing a display device mounted on a host vehicle to display a host vehicle's behind-the-vehicle image, the host vehicle's behind-the-vehicle image being an image of an area behind the host vehicle, the host vehicle's behind-the-vehicle image being captured by a sensor of the host vehicle; detecting a rearward vehicle, the rearward vehicle being another vehicle existing behind the host vehicle; causing the display device to display the host vehicle's behind-the-vehicle image with a first contrast ratio when the rearward vehicle is not detected; and causing the display device to display the host vehicle's behind-the-vehicle image with a second contrast ratio when the rearward vehicle is detected, the second contrast ratio being higher than the first contrast ratio.

As described above, the display control device for a vehicle according to the present disclosure provides makes it possible to display an image closer to an image formed on the optical mirror and, at the same time, if there is a rearward vehicle, makes it easier to recognize the relative vehicle speed between the host vehicle and the rearward vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

[Overview]

A display control device for a vehicle according to the present disclosure is a display control device that is mounted on a vehicle for displaying the vehicle's behind-the-vehicle image, captured by a capturing unit, on a display unit. This display control device makes the contrast ratio of an image, displayed on the display unit, higher when a rearward vehicle is detected than when a rearward vehicle is not detected. This makes it easier to recognize the movement of a rearward vehicle in the image displayed on the display unit, thus reducing a driver's error in sensing the relative vehicle speed between the host vehicle and the rearward vehicle.

First Embodiment

<System Configuration>

Figure 1:
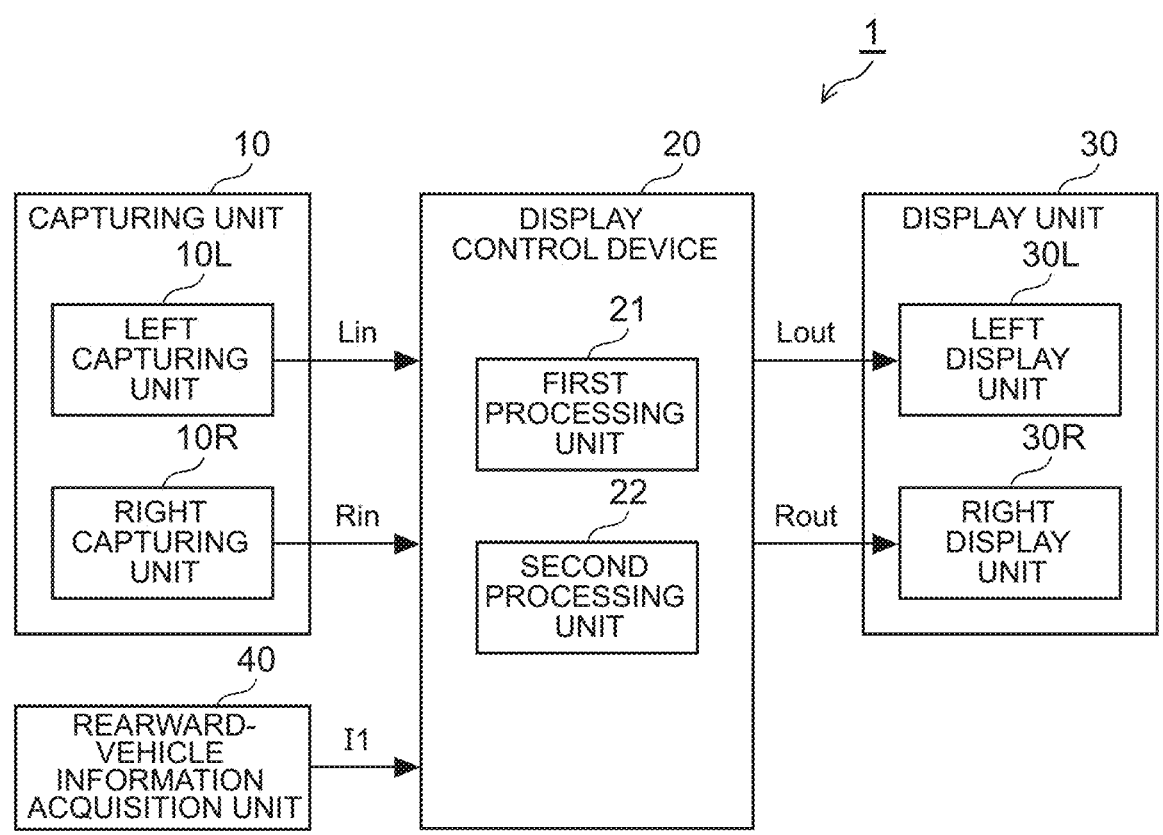
FIG. 1 is a diagram showing a general configuration of a vehicle system that includes a display control device for a vehicle in a first embodiment of the present disclosure.

FIG. 1 is a diagram showing a general configuration of a vehicle system 1 that includes a display control device 20 for a vehicle according to a first embodiment of the present disclosure. The vehicle system 1 shown in FIG. 1 includes a capturing unit 10, the display control device 20 in this embodiment, a display unit 30, and a rearward-vehicle information acquisition unit 40. The display control device 20 includes a first processing unit 21 and a second processing unit 22.

The vehicle system 1 exemplified in this embodiment is an electronic outer mirror system mounted on a vehicle as a substitute for an optical outer mirror (door mirror) system. In the vehicle system 1 exemplified in this embodiment, the display control device 20 sets the contrast ratio of a vehicle's laterally rearward image, captured by the capturing unit 10, to an appropriate contrast ratio and then displays the resulting image on the display unit 30 as an electronic mirror image.

The capturing unit 10 includes a left capturing unit 10L and a right capturing unit 10R. The left capturing unit 10L is installed, for example, on the left side of the vehicle exterior. The left capturing unit 10L captures a predetermined range in the vehicle's left laterally rearward direction, which is behind its installation position, to acquire a left rearward image Lin. Similarly, the right capturing unit 10R is installed, for example, on the right side of the vehicle exterior. The right capturing unit 10R captures a predetermined range in the vehicle's right laterally rearward direction, which is behind its installation position, to acquire a right rearward image Rin. In this specification, the terms "behind-the-vehicle" and "behind" refer not only to an area directly behind the vehicle but also to the whole area behind the vehicle (both directly and laterally) in the vehicle longitudinal direction.

As the left capturing unit 10L and the right capturing unit 10R, an image sensor, such as a Charge Coupled Device (CCD) sensor and a Complementary Metal Oxide Semiconductor (CMOS) sensor, or a camera equipped with optical lenses can be used.

The rearward-vehicle information acquisition unit 40 is installed, for example, in the rear of the vehicle. The rearward-vehicle information acquisition unit 40 acquires information I1 on a rearward vehicle that is another vehicle located behind the host vehicle. The information I1 on a rearward vehicle (hereinafter referred to as "rearward vehicle information") is information that includes the position (direction), traveling speed, and traveling direction of the rearward vehicle. It should be noted that a "rearward vehicle" in the present disclosure also includes a vehicle such as a bicycle or a motorbike.

As the rearward-vehicle information acquisition unit 40, a radar using laser waves, millimeter waves, or microwaves can be used. The rearward-vehicle information acquisition unit 40 detects a rearward vehicle by sending radio waves and then receiving the reflected waves that are returned when the radio waves hit the rearward vehicle. By doing so, the rearward-vehicle information acquisition unit 40 acquires various types of information on the rearward vehicle, for example, the position (direction), traveling speed, and traveling direction of the rearward vehicle.

The display control device 20 receives the left rearward image Lin from the left capturing unit 10L, and the right rearward image Rin from the right capturing unit 10R. In addition, the display control device 20 receives the rearward vehicle information I1 from the rearward-vehicle information acquisition unit 40. After that, the display control device 20 performs the contrast ratio control processing required for the left rearward image Lin and the right rearward image Rin based on the rearward vehicle information I1 and then outputs the resulting image to the display unit 30.

The display control device 20 may be configured as an Electronic Control Unit (ECU) that typically includes a Central Processing Unit (CPU), a memory, and an input/output interface. The electronic control unit causes the CPU to read a predetermined program from the memory for execution in order to implement the functions of the first processing unit 21 and the second processing unit 22 that will be described below.

The first processing unit 21 performs the rearward-vehicle detection processing. In this processing, the first processing unit 21 determines whether there is a rearward vehicle in at least one of the left laterally rearward direction and the right laterally rearward direction of the host vehicle, based on the rearward vehicle information I1 received from the rearward-vehicle information acquisition unit 40.

The second processing unit 22 sets the contrast ratio of the left rearward image Lin and the right rearward image Rin as described below based on the result of the rearward-vehicle detection processing performed by the first processing unit 21.

If a rearward vehicle is not detected by the first processing unit 21, the second processing unit 22 sets the contrast ratio of the left rearward image Lin and the right rearward image Rin, both of which are captured by the capturing unit 10, to a predetermined first contrast ratio. That is, if a rearward vehicle is not detected, the contrast ratio of both the left rearward image Lin and the right rearward image Rin is set to the first contrast ratio.

On the other hand, if a rearward vehicle is detected by the first processing unit 21, the second processing unit 22 sets the contrast ratio of the left rearward image Lin and the right rearward image Rin, both of which are captured by the capturing unit 10, to a predetermined second contrast ratio higher than the first contrast ratio described above. The contrast ratio can be increased by increasing the brightness difference between the bright part and the dark part or by emphasizing the edge of the image.

If a rearward vehicle is detected as described above, the contrast ratio of both of the left rearward image Lin and the right rearward image Rin, or one the left rearward image Lin and the right rearward image Rin, may be set to the second contrast ratio. In the latter case, the contrast ratio is typically set as follows. That is, if a rearward vehicle is detected in the left laterally rearward direction of the host vehicle, the contrast ratio of only the left rearward image Lin is set to the second contrast ratio. On the other hand, if a rearward vehicle is detected in the right laterally rearward direction of the host vehicle, the contrast ratio of only the right rearward image Rin is set to the second contrast ratio.

After setting the contrast ratio of the left rearward image Lin and the right rearward image Rin as described above, the second processing unit 22 outputs one of the left rearward image Lin, whose contrast ratio is set to the first contrast ratio, and the left rearward image Lin, whose contrast ratio is set to the second contrast ratio, to the display unit 30 as a left rearward output image Lout. Similarly, the second processing unit 22 outputs one of the right rearward image Rin, whose contrast ratio is set to the first contrast ratio, and the right rearward image Rin, whose contrast ratio is set to the second contrast ratio, to the display unit 30 as a right rearward output image Rout.

The display unit 30 includes a left display unit 30L and a right display unit 30R. The left display unit 30L is arranged, for example, in the left forward direction in the vehicle interior with respect to the driver's seat. The left display unit 30L displays the left rearward output image Lout, received from the display control device 20, in the predetermined display area. Similarly, the right display unit 30R is arranged, for example, in the right forward direction in the vehicle interior with respect to the driver's seat. The right display unit 30R displays the right rearward output image Rout, received from the display control device 20, in the predetermined display area.

A display panel such as a liquid crystal panel, a Light Emitting Diode (LED) panel, or an organic Electro Luminescence (EL) panel, can be used for the left display unit 30L and the right display unit 30R.

The left display unit 30L and the right display unit 30R may be implemented each as an independent display panel or may be implemented as a single display panel in which the display area is divided into two.

<Control Performed by Display Control Device>

Next, the image contrast ratio control processing performed by the display control device 20 in the first embodiment of the present disclosure will be described with reference to FIG. 2 and FIGS. 3A-3B. In the example described below, the contrast ratio of both the left rearward image Lin and the right rearward image Rin is controlled regardless of the position where a rearward vehicle is detected.

Figure 2:
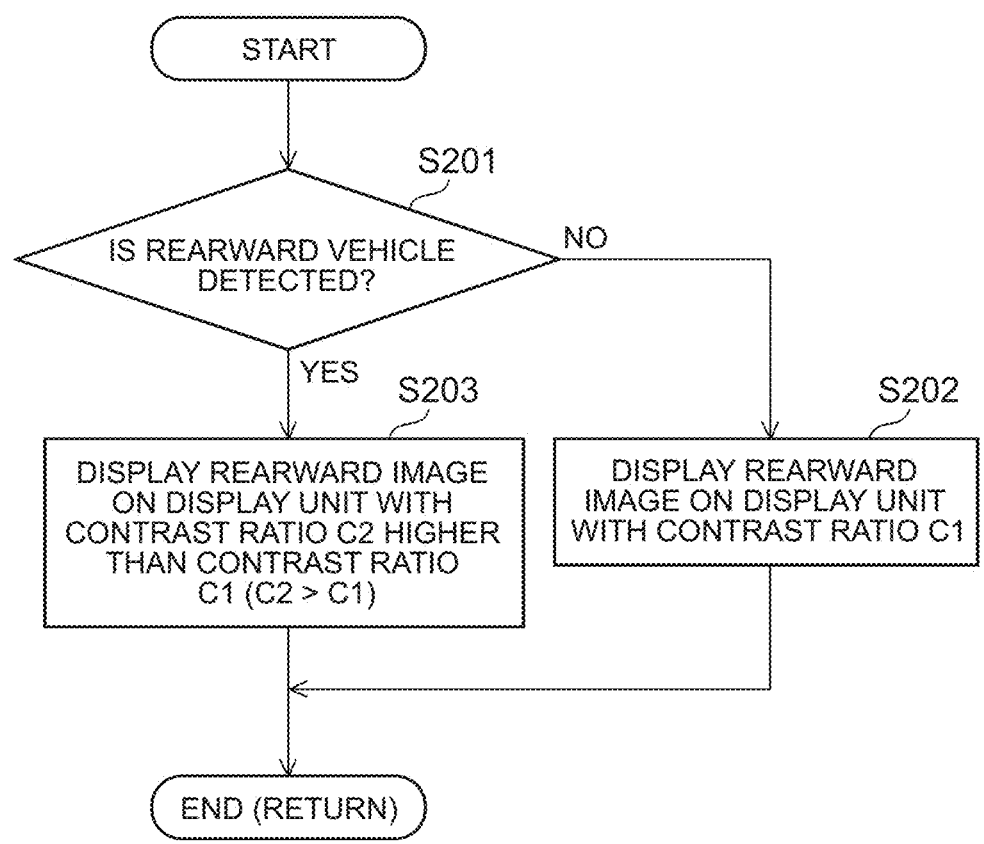
FIG. 2 is a flowchart showing a processing procedure performed by a display control device in a first embodiment for controlling the contrast ratio of an image.
Figure 3A:
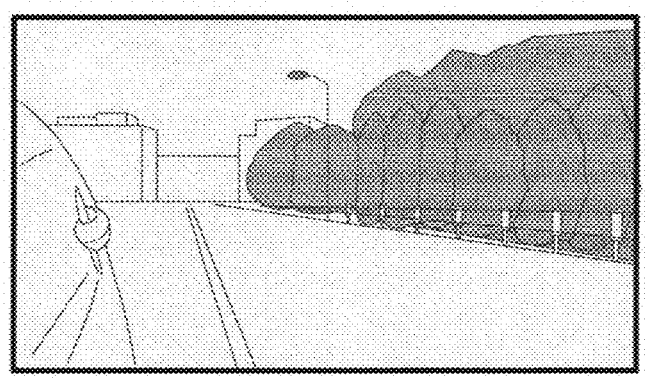
FIG. 3A is a diagram showing an example in which a right rearward output image is displayed in the display area of a right display unit.
Figure 3B:
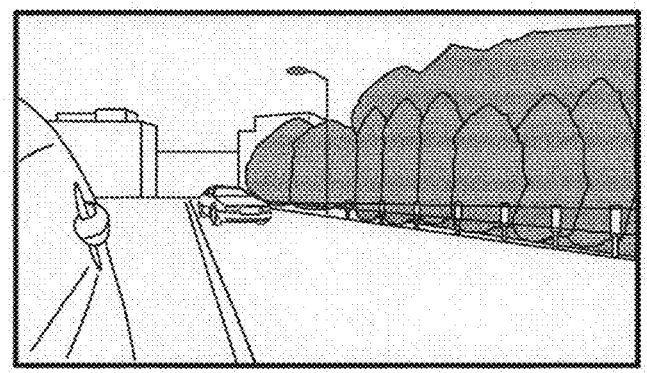
FIG. 3B is a diagram showing an example in which a right rearward output image is displayed in the display area of a right display unit.

FIG. 2 is a flowchart showing a processing procedure performed by the display control device 20 for controlling the contrast ratio of a rearward image. FIG. 3A is a diagram showing an example in which the right rearward output image Rout whose contrast ratio is set to the first contrast ratio is displayed. FIG. 3B is a diagram showing an example in which the right rearward output image Rout whose contrast ratio is set to the second contrast ratio, higher than the first contrast ratio, is displayed.

The processing shown in FIG. 2 is started, for example, when the door of the vehicle is unlocked or the engine is started. The processing is performed repeatedly, for example, at predetermined intervals until the door of the vehicle is locked or the engine is stopped.

Step S201: In this processing, the first processing unit 21 of the display control device 20 determines whether a rearward vehicle is detected in the laterally rearward direction of the host vehicle based on the rearward vehicle information I1. The laterally rearward direction in which the determination is made whether a rearward vehicle is detected in this step may be at least one of the left laterally rearward direction and the right laterally rearward direction. If it is determined that a rearward vehicle is not detected (S201, No), the processing proceeds to step S202. On the other hand, if it is determined that a rearward vehicle is detected (S201, Yes), the processing proceeds to step S203.

Step S202: In this processing, the second processing unit 22 of the display control device 20 sets the contrast ratio of the left rearward image Lin and the right rearward image Rin to a first contrast ratio C1, respectively. The first contrast ratio C1 may be the original contrast ratio of the left rearward image Lin and the right rearward image Rin, received from the capturing unit 10, or may be a contrast ratio changed from the original contrast ratio.

After that, the second processing unit 22 outputs the left rearward image Lin, whose contrast ratio is set to the first contrast ratio C1, to the left display unit 30L as the left rearward output image Lout. Similarly, the second processing unit 22 outputs the right rearward image Rin, whose contrast ratio is set to the first contrast ratio C1, to the right display unit 30R as the right rearward output image Rout. FIG. 3A is a diagram showing an example in which the right rearward output image Rout with the first contrast ratio C1 is displayed in the display area of the right display unit 30R.

Step S203: In this processing, the second processing unit 22 of the display control device 20 sets the contrast ratio of the left rearward image Lin and the right rearward image Rin to a second contrast ratio C2, respectively. The second contrast ratio C2 is set higher than the above-described first contrast ratio C1 (C2>C1).

After that, the second processing unit 22 outputs the left rearward image Lin, whose contrast ratio is set to the second contrast ratio C2, to the left display unit 30L as the left rearward output image Lout. Similarly, the second processing unit 22 outputs the right rearward image Rin, whose contrast ratio is set to the second contrast ratio C2, to the right display unit 30R as the right rearward output image Rout. FIG. 3B is a diagram showing an example in which the right rearward output image Rout with the second contrast ratio C2 is displayed in the display area of the right display unit 30R.

After the processing in step S202 or step S203 is executed, one flow (one cycle) of the image contrast ratio control processing is terminated, and the processing returns to the processing in step S201.

<Operation and Effect in this Embodiment>

The display control device 20 for a vehicle in the first embodiment of the present disclosure described above sets the contrast ratio of an image, captured by the capturing unit 10, higher when a rearward vehicle is detected in the laterally rearward direction of the host vehicle than when a rearward vehicle is not detected and then displays the resulting image on the display unit 30.

The display control device 20 performs the image contrast ratio control processing as described above to display an image with a relatively low contrast ratio on the display unit 30 if there is not a rearward vehicle, thus providing the driver with an image closer to an image on the optical mirror. On the other hand, if there is a rearward vehicle, the display control device 20 causes the display unit 30 to display an image with a relatively high contrast ratio, making it easier to recognize the movement of the rearward vehicle appearing in the image displayed on the display unit 30. Therefore, if there is a rearward vehicle, the display control device 20 reduces a driver's error in sensing the relative vehicle speed between the host vehicle and the rearward vehicle.

The contrast ratio control processing described above can be used, for example, when the driver wants to change the lane in which the host vehicle travels. That is, the display control device 20 allows the driver to easily determine the timing in which to perform the steering wheel operation to safely change lanes, based on the image displayed on the display unit 30.

Second Embodiment

<System Configuration>

Figure 4:
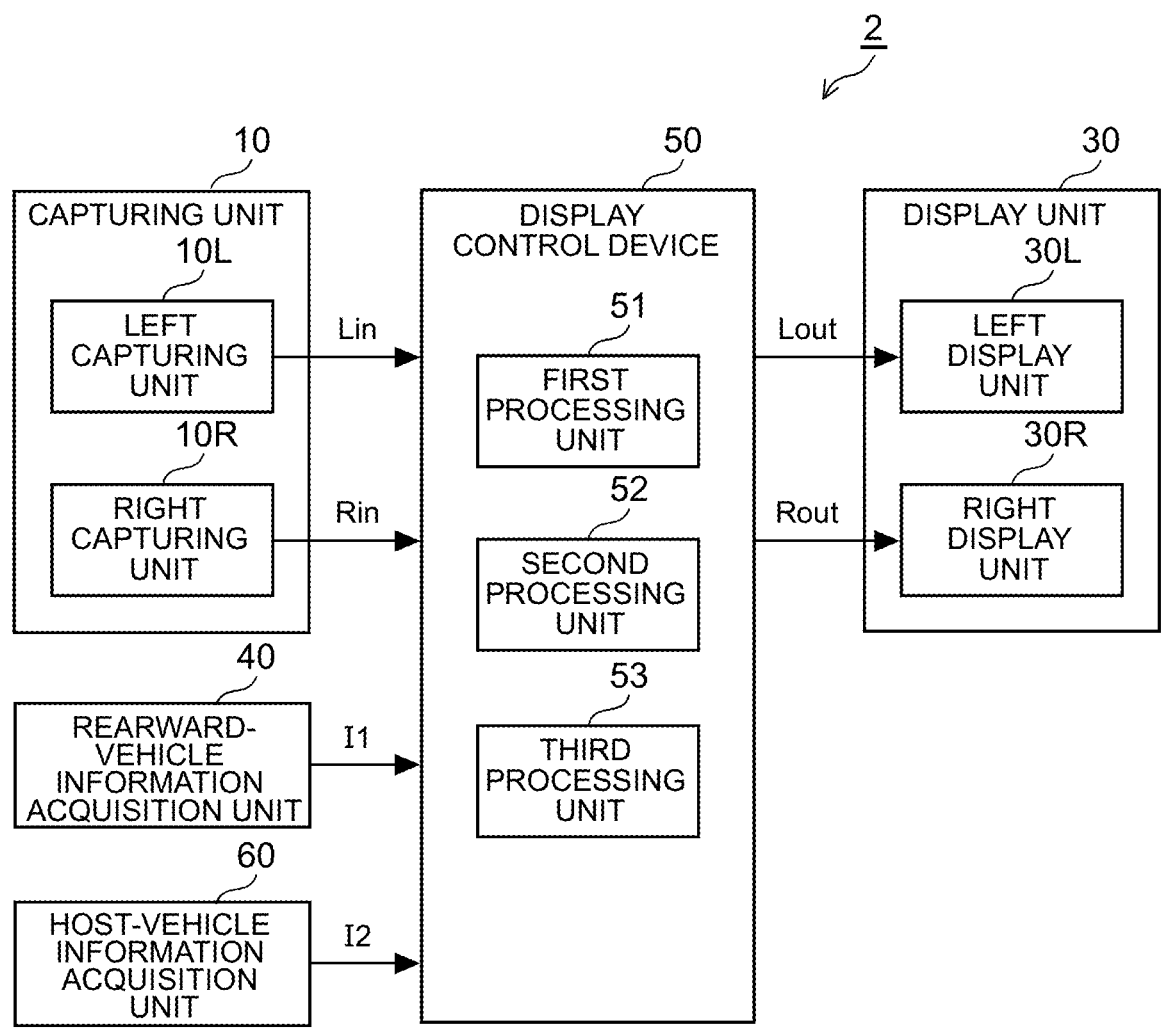
FIG. 4 is a diagram showing a general configuration of a vehicle system that includes a display control device for a vehicle in a second embodiment of the present disclosure.

FIG. 4 is a diagram showing a general configuration of a vehicle system 2 that includes a display control device 50 for a vehicle according to a second embodiment of the present disclosure. The vehicle system 2 shown in FIG. 4 includes a capturing unit 10, the display control device 50 in this embodiment, a display unit 30, a rearward-vehicle information acquisition unit 40, and a host-vehicle information acquisition unit 60. The display control device 50 includes a first processing unit 51, a second processing unit 52, and a third processing unit 53.

The vehicle system 2 in the second embodiment is different from the vehicle system 1 in the first embodiment described above in that the display control device 50 has a different configuration and in that the host-vehicle information acquisition unit 60 is added. The vehicle system 2 exemplified in this embodiment is also an electronic outer mirror system mounted on a vehicle as a substitute for an optical outer mirror (door mirror) system. In the vehicle system 2, the display control device 50 sets the contrast ratio of a vehicle's laterally rearward image, captured by the capturing unit 10, to an appropriate contrast ratio and then displays the image on the display unit 30 as an electronic mirror image.

In the description below, the vehicle system 2 in the second embodiment will be described with focus on the above-described components with configurations different from those in the first embodiment. For the other components, the same reference numerals are used for the corresponding components as those in the vehicle system 1 described above and the duplicated description thereof is omitted.

The host-vehicle information acquisition unit 60 is a unit installed in a predetermined position in the vehicle for acquiring the information I2 on the host vehicle. The information on the host vehicle (hereinafter referred to as "host vehicle information") I2 includes at least the traveling speed (vehicle speed) of the host vehicle. For example, a speed sensor is used for acquiring the vehicle speed. The host vehicle information I2, acquired by the host-vehicle information acquisition unit 60, is output to the display control device 50.

The display control device 50 receives the left rearward image Lin from the left capturing unit 10L, and the right rearward image Rin from the right capturing unit 10R. In addition, the display control device 50 receives the rearward vehicle information I1 from the rearward-vehicle information acquisition unit 40, and the host vehicle information I2 from the host-vehicle information acquisition unit 60, respectively. The display control device 50 determines how to set the contrast ratio of the left rearward image Lin and the right rearward image Rin, based on the rearward vehicle information I1 and the host vehicle information I2. After that, the display control device 50 outputs the left rearward image Lin and the right rearward image Rin, each with the controlled contrast ratio that has been set as described above, to the display unit 30.

The display control device 50 may be configured as an Electronic Control Unit (ECU) that typically includes a Central Processing Unit (CPU), a memory, and an input/output interface. The electronic control unit causes the CPU to read a predetermined program from the memory for execution in order to implement the functions of the first processing unit 51, the second processing unit 52, and the third processing unit 53 that will be described below.

The first processing unit 51 performs the rearward-vehicle detection processing. In this processing, the first processing unit 51 determines whether there is a rearward vehicle in at least one of the left laterally rearward direction and the right laterally rearward direction of the host vehicle, based on the rearward vehicle information I1 received from the rearward-vehicle information acquisition unit 40.

If a rearward vehicle is detected by the first processing unit 51, the third processing unit 53 finds the relative vehicle speed between the detected rearward vehicle and the host vehicle based on the host vehicle information I2 received from the host-vehicle information acquisition unit 60. In this embodiment, the relative vehicle speed is a value calculated by subtracting the traveling speed of the host vehicle from the traveling speed of the rearward vehicle.

The second processing unit 52 sets the contrast ratio of the left rearward image Lin and the right rearward image Rin as described below, based on the result of the rearward vehicle detection processing performed by the first processing unit 51 and on the relative vehicle speed between the host vehicle and the rearward vehicle calculated by the third processing unit 53.

If a rearward vehicle is not detected by the first processing unit 51, the second processing unit 52 sets the contrast ratio of the left rearward image Lin and the right rearward image Rin, both of which are captured by the capturing unit 10, to a predetermined first contrast ratio. That is, if a rearward vehicle is not detected, the contrast ratio of both the left rearward image Lin and the right rearward image Rin is set to the first contrast ratio.

On the other hand, if a rearward vehicle is detected by the first processing unit 51, the second processing unit 52 sets the contrast ratio of the left rearward image Lin and the right rearward image Rin, both of which are captured by the capturing unit 10, to a predetermined second contrast ratio higher than the first contrast ratio described above. At this time, if the relative vehicle speed between the host vehicle and the rearward vehicle calculated by the third processing unit 53 is equal to or greater than a predetermined threshold value (positive value), the second processing unit 52 sets the contrast ratio of the left rearward image Lin and the right rearward image Rin to a predetermined third contrast ratio that is still higher than the second contrast ratio.

If a rearward vehicle is detected as described above, the contrast ratio of both of the left rearward image Lin and the right rearward image Rin, or one of the left rearward image Lin and the right rearward image Rin, may be set to the second contrast ratio or to the third contrast ratio as in the first embodiment.

After setting the contrast ratio of the left rearward image Lin and the right rearward image Rin as described above, the second processing unit 52 outputs one of the left rearward image Lin whose contrast ratio is set to the first contrast ratio, the left rearward image Lin whose contrast ratio is set to the second contrast ratio, and the left rearward image Lin whose contrast ratio is set to the third contrast ratio to the display unit 30 as the left rearward output image Lout. Similarly, the second processing unit 52 outputs one of the right rearward image Rin whose contrast ratio is set to the first contrast ratio, the right rearward image Rin whose contrast ratio is set to the second contrast ratio, and the right rearward image Rin whose contrast ratio is set to the third contrast ratio to the display unit 30 as the right rearward output image Rout.

The left display unit 30L of the display unit 30 displays the left rearward output image Lout, received from the display control device 50, in the predetermined display area. Similarly, the right display unit 30R of the display unit 30 displays the right rearward output image Rout, received from the display control device 50, in the predetermined display area.

<Control Performed by Display Control Device>

Next, the image contrast ratio control processing performed by the display control device 50 in the second embodiment of the present disclosure will be described with reference to FIG. 5 and FIGS. 6A-6C. In this example, the contrast ratio of both the left rearward image Lin and the right rearward image Rin is controlled regardless of the position where a rearward vehicle is detected.

Figure 5:
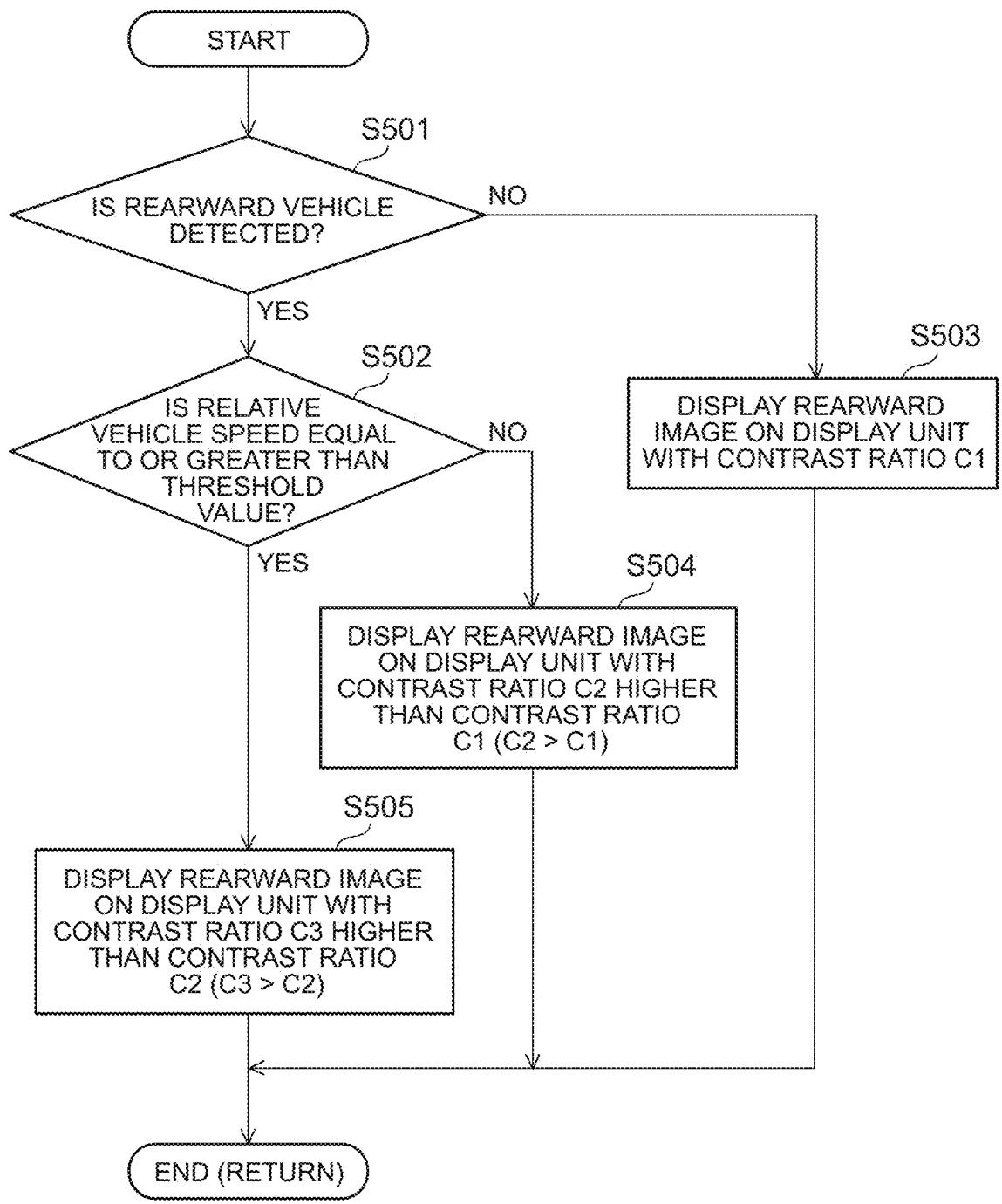
FIG. 5 is a flowchart showing a processing procedure performed by a display control device in a second embodiment for controlling the contrast ratio of an image.
Figure 6A:
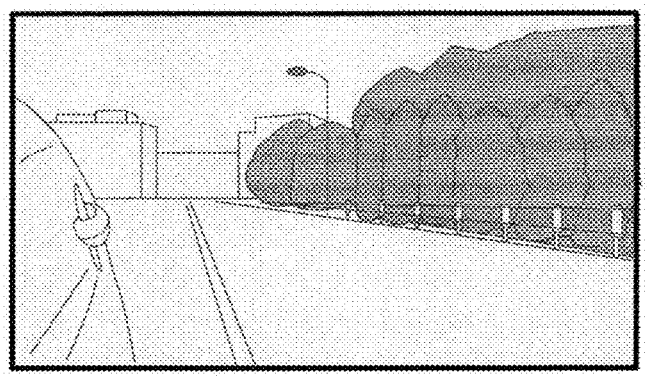
FIG. 6A is a diagram showing an example in which a right rearward output image is displayed in the display area of a right display unit.
Figure 6B:
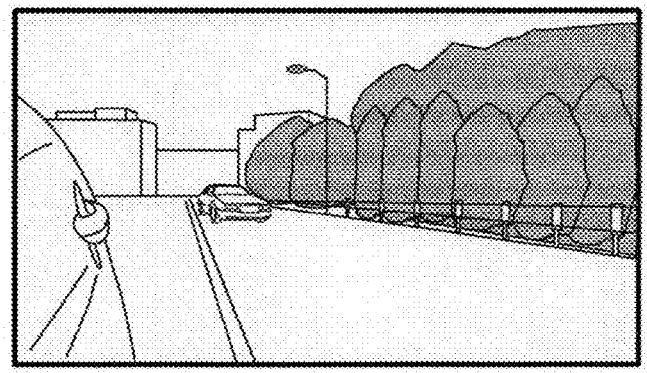
FIG. 6B is a diagram showing an example in which a right rearward output image is displayed in the display area of a right display unit.
Figure 6C:
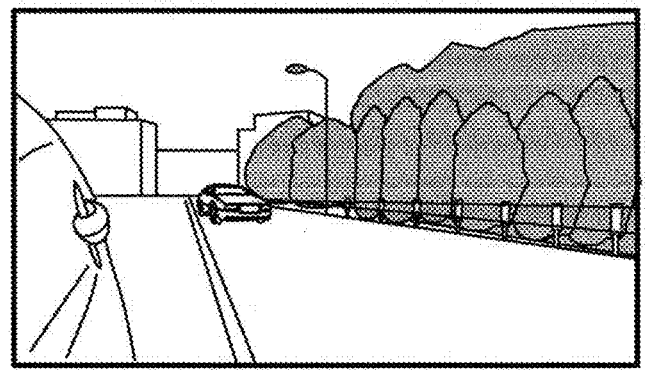
FIG. 6C is a diagram showing an example in which a right rearward output image is displayed in the display area of a right display unit.

FIG. 5 is a flowchart showing a processing procedure performed by the display control device 50 for controlling the contrast ratio of a rearward image. FIG. 6A is a diagram showing an example in which the right rearward output image Rout whose contrast ratio is set to the first contrast ratio is displayed. FIG. 6B is a diagram showing an example in which the right rearward output image Rout whose contrast ratio is set to the second contrast ratio, higher than the first contrast ratio, is displayed. FIG. 6C is a diagram showing an example in which the right rearward output image Rout whose contrast ratio is set to the third contrast ratio, still higher than the second contrast ratio, is displayed.

The processing shown in FIG. 5 is started, for example, when the door of the vehicle is unlocked or the engine is started. The processing is performed repeatedly, for example, at predetermined intervals until the door of the vehicle is locked or the engine is stopped.

Step S501: In this processing, the first processing unit 51 of the display control device 50 determines whether a rearward vehicle is detected in the laterally rearward direction of the host vehicle based on the rearward vehicle information I1. The laterally rearward direction in which the determination is made whether a rearward vehicle is detected in this step may be at least one of the left laterally rearward direction and the right laterally rearward direction. If it is determined that a rearward vehicle is not detected (S501, No), the processing proceeds to step S503. On the other hand, if it is determined that a rearward vehicle is detected (S501, Yes), the processing proceeds to step S502.

Step S502: In this processing, the third processing unit 53 of the display control device 50 calculates the relative vehicle speed between the rearward vehicle, detected by the first processing unit 51, and the host vehicle using the host vehicle information I2. After that, the third processing unit 53 determines whether the calculated relative vehicle speed is equal to or greater than a predetermined threshold value. This predetermined threshold value, a positive number value that can be arbitrarily set, may be a fixed value or a variable value that varies depending on the traveling speed of the host vehicle. This means that, in this processing, it can be determined whether the rearward vehicle is approaching the host vehicle at or above a certain speed. If it is determined that the relative vehicle speed is less than the predetermined threshold value (S502, No), the processing proceeds to step S504. On the other hand, if it is determined that the relative vehicle speed is equal to or greater than the predetermined threshold value (S502, Yes), the processing proceeds to step S505.

Step S503: In this processing, the second processing unit 52 of the display control device 50 sets the contrast ratio of the left rearward image Lin and the right rearward image Rin to a first contrast ratio C1, respectively. The first contrast ratio C1 may be the original contrast ratio of the left rearward image Lin and the right rearward image Rin, received from the capturing unit 10, or may be a contrast ratio changed from the original contrast ratio.

After that, the second processing unit 52 outputs the left rearward image Lin, whose contrast ratio is set to the first contrast ratio C1, to the left display unit 30L as the left rearward output image Lout. Similarly, the second processing unit 52 outputs the right rearward image Rin, whose contrast ratio is set to the first contrast ratio C1, to the right display unit 30R as the right rearward output image Rout. FIG. 6A is a diagram showing an example in which the right rearward output image Rout with the first contrast ratio C1 is displayed in the display area of the right display unit 30R.

Step S504: In this processing, the second processing unit 52 of the display control device 50 sets the contrast ratio of the left rearward image Lin and the right rearward image Rin to a second contrast ratio C2, respectively. The second contrast ratio C2 is set higher than the above-described first contrast ratio C1 (C2>C1).

After that, the second processing unit 52 outputs the left rearward image Lin, whose contrast ratio is set to the second contrast ratio C2, to the left display unit 30L as the left rearward output image Lout. Similarly, the second processing unit 52 outputs the right rearward image Rin, whose contrast ratio is set to the second contrast ratio C2, to the right display unit 30R as the right rearward output image Rout. FIG. 6B is a diagram showing an example in which the right rearward output image Rout with the second contrast ratio C2 is displayed in the display area of the right display unit 30R.

Step S505: In this processing, the second processing unit 52 of the display control device 50 sets the contrast ratio of the left rearward image Lin and the right rearward image Rin to a third contrast ratio C3, respectively. The third contrast ratio C3 is set higher than the above-described first contrast ratio C1 and second contrast ratio C2 (C3>C2>C1).

After that, the second processing unit 52 outputs the left rearward image Lin, whose contrast ratio is set to the third contrast ratio C3, to the left display unit 30L as the left rearward output image Lout. Similarly, the second processing unit 52 outputs the right rearward image Rin, whose contrast ratio is set to the third contrast ratio C3, to the right display unit 30R as the right rearward output image Rout. FIG. 6C is a diagram showing an example in which the right rearward output image Rout with the third contrast ratio C3 is displayed in the display area of the right display unit 30R.

After the processing in one of steps S503, 504, and S505 is executed, one flow (one cycle) of the image contrast ratio control processing is terminated, and the processing returns to the processing in step S501.

<Operation and Effect in this Embodiment>

The display control device 50 for a vehicle in the second embodiment of the present disclosure described above sets the contrast ratio of an image, captured by the capturing unit 10, higher when a rearward vehicle is detected in the laterally rearward direction of the host vehicle than when a rearward vehicle is not detected and then displays the resulting image on the display unit 30. In addition, if the relative vehicle speed between the rearward vehicle and the host vehicle is equal to or greater than the threshold value, the display control device 50 further increases the contrast ratio of the image, captured by the capturing unit 10, and then displays the resulting image on the display unit 30.

The display control device 50 that performs the image contrast ratio control processing has the following effect. That is, when there is not a rearward vehicle, the display control device 50 displays an image with a relatively low contrast ratio on the display unit 30, providing the driver with an image closer to the image on the optical mirror. On the other hand, when there is a rearward vehicle, the display control device 50 displays an image with a relatively high contrast ratio on the display unit 30, making it easier to recognize the movement of the rearward vehicle appearing in the image displayed on the display unit 30. Therefore, when there is a rearward vehicle, the display control device 50 reduces a driver's error in sensing the relative vehicle speed between the host vehicle and the rearward vehicle.

In addition, when the relative vehicle speed between the host vehicle and a rearward vehicle is large to some extent, the display control device 50 displays an image with a still higher contrast ratio on the display unit 30, making it easier to recognize the movement of the rearward vehicle appearing in the image displayed on the display unit 30. Therefore, when there is a rearward vehicle, the display control device 50 further reduces a driver's error in sensing the relative vehicle speed between the host vehicle and the rearward vehicle.

The contrast ratio control processing described above can be used, for example, when the driver wants to change the lane in which the vehicle travels. That is, the display control device 50 allows the driver to easily determine the timing in which to perform the steering wheel operation to safely change lanes based on the image displayed on the display unit 30.

Application Example

The above-described embodiments can be implemented in various forms in which various modifications and improvements are made based on the knowledge of those skilled in the art.

In the description of the above embodiments, the vehicle systems 1 and 2 are each an electronic outer mirror system in which the image in the laterally rearward direction of the vehicle is displayed on the display unit 30. However, the display control devices 20 and 50 of the present disclosure can be used in various scenes in which, when there is a rearward vehicle, it is desired to easily recognize the relative vehicle speed between the host vehicle and the rearward vehicle while still making it possible to display an image closer to the image formed on the optical mirror. For example, the display control devices 20 and 50 of the present disclosure may be used for an electronic inner mirror (including a room mirror, a rearview mirror, etc.) system that displays the vehicle's rearward image on the display unit.

In the second embodiment described above, if the relative vehicle speed between the host vehicle and a rearward vehicle, calculated by the third processing unit 53, is equal to or greater than the predetermined threshold value, the second processing unit 52 sets the contrast ratio of the left rearward image Lin and the right rearward image Rin to the third contrast ratio. However, the present disclosure is not limited to this contrast ratio control method. For example, the second processing unit 52 does not have to compare the relative vehicle speed between the host vehicle and the rearward vehicle with the predetermined threshold value. Instead of using the predetermined threshold value, the second processing unit 52 may be configured to incrementally increase the contrast ratio of the displayed image as the relative vehicle speed between the host vehicle and the rearward vehicle increases.

Furthermore, in each of the above embodiments, the capturing unit 10 may function also as the rearward-vehicle information acquisition unit 40. In this case, there is no need to provide the rearward-vehicle information acquisition unit 40 as a separate component.

The display control device for a vehicle according to the present disclosure can be used for a system that displays an image, captured by an image capturing unit, on a display unit. In particular, the display control device is effectively used in a scene in which, when there is a rearward vehicle, it is desired to easily recognize the relative vehicle speed between the host vehicle and the rearward vehicle while still making it possible to display an image closer to the image formed on the optical mirror.

What is claimed is:

1. A display control device for a vehicle comprising:
at least one electronic control unit configured to:
cause a display device to display a host vehicle's behind-the-vehicle image, the host vehicle's behindthe-vehicle image being an image of an area behind a host vehicle, the host vehicle's behind-the-vehicle image being captured by a sensor of the host vehicle;

detect a rearward vehicle, the rearward vehicle travelling on a lane behind the host vehicle;

cause the display device to display the host vehicle's behind-the-vehicle image with a first contrast ratio in response to the rearward vehicle not being detected;

cause the display device to display the host vehicle's behind-the-vehicle image with a second contrast ratio in response to the rearward vehicle being detected;

calculate a relative vehicle speed between the rearward vehicle and the host vehicle; and cause the display device to display the host vehicle's behind-the-vehicle image with a third contrast ratio when the rearward vehicle is detected and when the relative vehicle speed is equal to or greater than a predetermined threshold value, wherein the second contrast ratio is higher than the first contrast ratio, and the third contrast ratio is higher than the second contrast ratio.

2. The display control device for a vehicle according to claim 1, wherein the display device is an electronic mirror mounted on the host vehicle.

3. A vehicle comprising:

the display control device of claim 1; and a sensor disposed in a rear of the vehicle and configured to acquire information on the rearward vehicle, wherein the at least one electronic control unit is configured to detect the rearward vehicle based upon the acquired information.

4. The display control device for a vehicle according to claim 1, wherein the at least one electronic control unit is configured to cause the display device to display the host vehicle's entire behind-the-vehicle image with the second contrast ratio when the rearward vehicle is detected.

5. A display control device for a vehicle comprising:

at least one electronic control unit configured to:

cause a display device to display a host vehicle's behind-the-vehicle image, the host vehicle's behind-the-vehicle image being an image of an area behind a host vehicle, the host vehicle's behind-the-vehicle image being captured by a sensor of the host vehicle;

detect a rearward vehicle, the rearward vehicle being another vehicle existing behind the host vehicle;

cause the display device to display the host vehicle's behind-the-vehicle image with a first contrast ratio in response to the rearward vehicle not being detected while the host vehicle is travelling forward;

cause the display device to display the host vehicle's behind-the-vehicle image with a second contrast ratio in response to the rearward vehicle being detected while the host vehicle is travelling forward;

calculate a relative vehicle speed between the rearward vehicle and the host vehicle; and cause the display device to display the host vehicle's behind-the-vehicle image with a third contrast ratio when the rearward vehicle is detected and when the relative vehicle speed is equal to or greater than a predetermined threshold value, wherein the second contrast ratio is higher than the first contrast ratio, and the third contrast ratio is higher than the second contrast ratio.

* * * * *

UNITED STATES PATENT AND TRADEMARK OFFICE
CERTIFICATE OF CORRECTION

| | | |
|---|---|---|
| PATENT NO. | : 10,668,856 B2 | Page 1 of 1 |
| APPLICATION NO. | : 15/921874 | |
| DATED | : June 2, 2020 | |
| INVENTOR(S) | : Goro Asai et al. | |

It is certified that error appears in the above-identified patent and that said Letters Patent is hereby corrected as shown below:

On the Title Page

Item (73), the Assignee's name is incorrect. Item (73) should read:
-- (73) Assignee: TOYOTA JIDOSHA KABUSHIKI KAISHA, Toyota-shi (JP) --

Signed and Sealed this
Fourth Day of August, 2020

Andrei Iancu
*Director of the United States Patent and Trademark Office*